Dec. 14, 1965 R. D. HANSEN ETAL 3,223,854

AVALANCHE TRANSISTOR CIRCUIT

Filed April 24, 1963

RAMON D. HANSEN
DELBERT E. BRIDENSTINE
*INVENTORS*

BY *Cadwallader And Kelly*

ATTORNEYS 3,223,854
Patented Dec. 14, 1965

3,223,854

AVALANCHE TRANSISTOR CIRCUIT

Ramon D. Hansen and Delbert E. Bridenstine, Las Vegas, Nevada, assignors to Edgerton, Germeshausen & Grier, Inc., Boston, Mass., a corporation of Massachusetts Filed Apr. 24, 1963, Ser. No. 275,409
6 Claims. (Cl. 307—88.5)

This invention relates to avalanche transistor circuits and more particularly to means for decreasing the recovery time without decreasing the amplitude of the output pulse of avalanche transistor circuits thereby increasing the repetition rate at which such circuits can be operated.

Avalanche transistor circuits have relatively large collector resistors which may range from 100K ohms to 1 megohm. Although increasing the collector resistance improves avalanching action, it causes recovery time to increase. This is undesirable because the repetition rate at which the circuit can be operated is thereby severely limited. Our invention decreases recovery time of such circuits by orders of magnitude while retaining improved avalanching action.

In its broader aspect our invention has even more general utility. Many electronic systems utilize resistance-capacitor circuits (hereinafter referred to as RC circuits) for various purposes all of which depend to a great extent on the time constants of such circuits. Our invention may be used in combination with such a circuit to decrease its time constant at a predetermined time. Further, where an RC circuit has a pulse input, the characteristics of the pulse and the resistance, R, may be utilized to cause our invention to decrease the time constant of the circuit.

Accordingly, it is an object of our invention to provide circuit improvements for reducing recovery time of avalanche transistor circuits while retaining improved avalanching action.

Another object of our invention is to provide an avalanche transistor circuit that can be operated at much higher repetition rates without decreasing the amplitude of its output pulses.

A further object of our invention is to provide an RC circuit capable of having its time constant decreased at a predetermined time.

Still another object of our invention is to provide an RC circuit adapted for use in pulse systems wherein the characteristics of the pulse and the resistor, R, are utilized to initiate a decrease in the time constant of the circuit.

Various other objects and advantages of the invention will become apparent from a perusal of the following specification and the drawing accompanying the same. In the drawing:

FIGURE 1 illustrates a conventional avalanche transistor circuit having component parts connected, as illustrated. These connections are:

Figure 1:
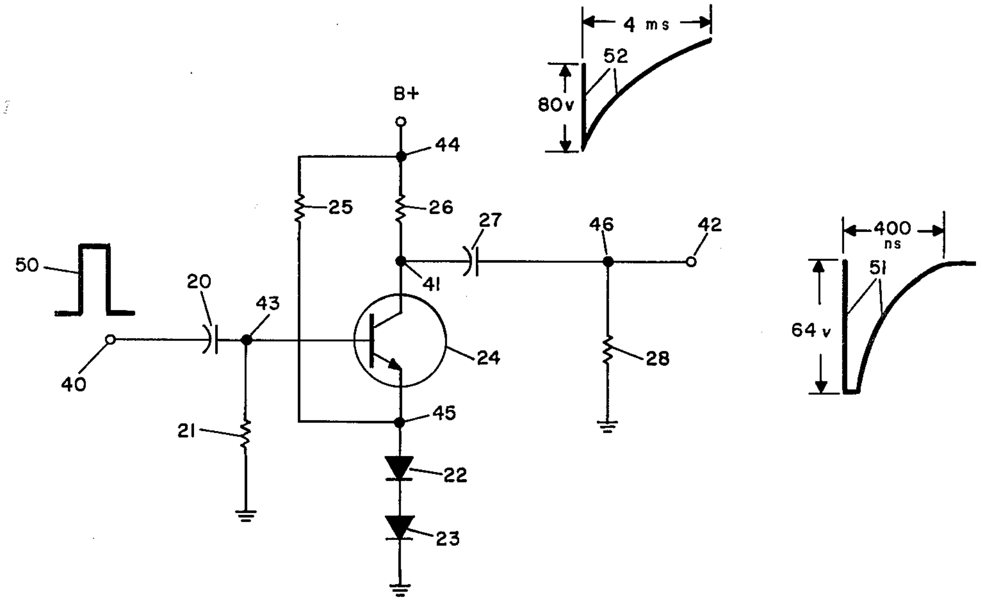
FIGURE 1 illustrates schematically a conventional avalanche transistor circuit and shows wave shapes at various terminals.

(1) Capacitor 20 connects to terminal 40 and terminal 43.
(2) Resistor 21 connects to ground and terminal 43, as illustrated.
(3) Terminal 43 connects to the base electrode of transistor 24, as illustrated.
(4) B+, the power supply, connects to terminal 44.
(5) Resistor 25 connects to terminal 44 and to terminal 45.

(6) The series connection of diodes 22 and 23 connects to ground and terminal 45, as illustrated.
(7) Terminal 45 connects to the emitter of transistor 24.
(8) Resistor 26 connects to terminal 44 and terminal 41.
(9) Terminal 41 connects to the collector of transistor 24.
(10) Capacitor 27 connects to terminal 41 and terminal 46.
(11) Resistor 28 connects to terminal 46 and to ground, as illustrated.
(12) Terminal 46 connects to output terminal 42.

In the quiescent state the voltage across diodes 22 and 23 reverse biases just slightly the emitter-base junction of transistor 24. The collector-base junction of transistor 24 is very highly reverse biased by the voltage on capacitor 27 which is charged substantially to the B+ power supply voltage. An input pulse 50, having a magnitude sufficient to forward bias the emitter-base junction of transistor 24, causes charge carriers to move toward the collector-base junction of transistor 24. Here, they come under the influence of the strong electric field across the collector-base junction, are accelerated to extremely high velocities and collide with atoms in the crystal producing more charge carriers that are accelerated to extremely high velocities. The process multiplies at astronomical rates, relatively, producing a large avalanching collector-emitter current. The collector potential drops to a voltage slightly above ground and capacitor 27 discharges through transistor 24, diodes 22 and 23 and resistor 28, producing output pulse 51. As soon as the discharge current of capacitor 27 drops below the holding current of transistor 24, avalanching action ceases. Capacitor 27 then recharges through resistors 26 and 28. The recovery time of the avalanche transistor circuit is equal to the recharge time of capacitor 27 which will be defined herein as equal to four time constants of the recharging RC circuit. The reason for this is that there is no other longer time factor that prevents the circuit from being reoperated. Where resistor 26 has a value between 100K ohms and 1 megohm, it will be apparent that recovery time is relatively long. As explained above, decreasing the value of resistor 26 well below 100K ohms results in reduced recovery time, but this also produces an undesirable degradation in avalanching action. Likewise, recovery time may be reduced by reducing the value of capacitor 27 but at the expense of reducing the amplitude of the output pulse.

For purposes of illustration and by way of example only, the component parts of the circuit of FIGURE 1 may have the values, or otherwise be identified, as tabulated below:

Capacitor 20—0.01 microfarad
Resistor 21—100 ohms
Diode 22—FD 100 (manufactured by Fairchild Semiconductor Corporation)
Diode 23—FD 100
Transistor 24—SYL 3013
Resistor 25—39K ohms
Resistor 26—1 megohm
Capacitor 27—0.001 microfarad
Resistor 28—100 ohms
B+ supply voltage—+90 volts In this example, the emitter-base junction is normally reverse biased to about 1½ volts. The collector-base junction is reverse biased to about 90 volts, the voltage on capacitor 27. An input pulse 50 having a magnitude slightly in excess of 1½ volts will forward bias the emitter-base junction of transistor 24 thereby initiating avalanching action. Output pulse 51 at terminal 42 will have the shape illustrated, a time duration of 400 nanoseconds, and have a magnitude of about 64 volts. The voltage at terminal 41 which represents capacitor recharge voltage, will have a wave shape illustrated at 52, with a time duration of 4 milliseconds, and have an amplitude of 80 volts. In this example, if collector resistor 26 is reduced to 1,000 ohms, recovery time is reduced to 4 microseconds, with however highly undesirable degradation in avalanching action and operation of transistor 24.

Figure 2:
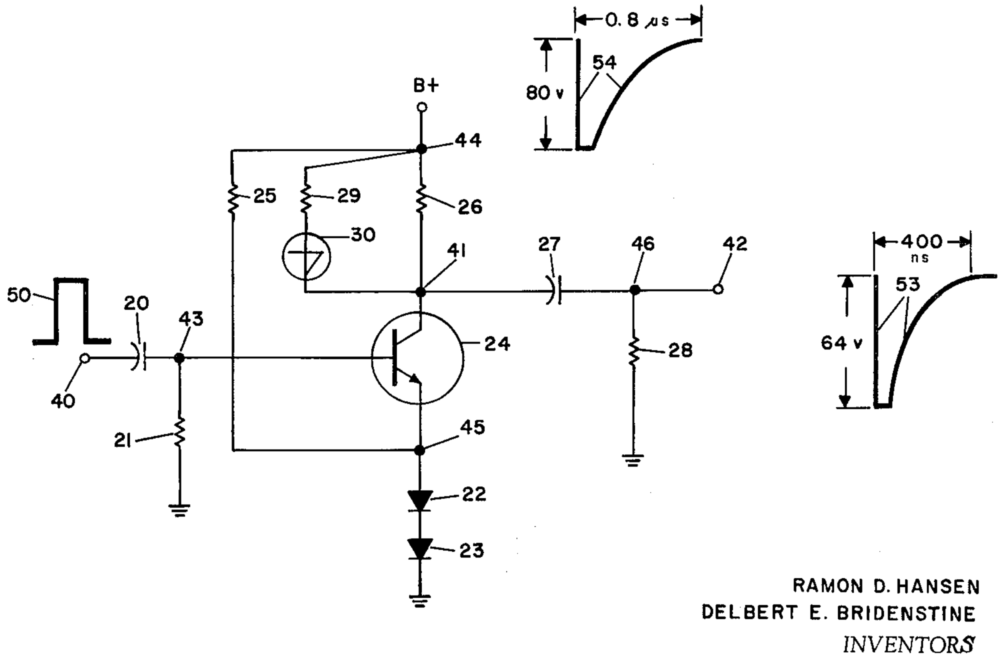
FIGURE 2 illustrates schematically the avalanche transistor circuit of FIGURE 1 together with our improved circuit modification and wave shapes at various terminals.

In FIGURE 2, the series circuit of transistor-current-limiting resistor 29 and four-layer diode 30 connects between terminals 44 and 41, as illustrated. The other circuit connections are exactly the same as in FIGURE 1. The value of resistor 29 is selected to limit the current in transistor 24 during avalanching to a value below its maximum safe value. Four-layer diode 30 must have a switching voltage somewhat less than the B+ supply voltage.

Input pulse 50 initiates avalanching action in the circuit of FIGURE 2 in the same manner as in the circuit of FIGURE 1. Note that in the quiescent state, four-layer diode 30 is not conducting. When avalanching starts, the collector potential of transistor 24 drops substantially to ground potential and the voltage across resistor 26 approaches B+ thereby causing four-layer diode 30 to switch to its "on," or low impedance, state. Again, capacitor 27 discharges until its discharge current drops below the holding current of transistor 24 at which time avalanching action ceases. Capacitor 27 starts to recharge through four-layer diode 30. Since its charging current is greater than the holding current of four-layer diode 30, four-layer diode 30 will remain in its "on," or low impedance, state until capacitor 27 is essentially charged, at which time four-layer diode 30 switches off. In its low impedance state, the resistance of four-layer diode 30 is about 1 ohm. Accordingly, the recharge time of capacitor 27 (or, as defined above, the recovery time of the avalanche transistor circuit) is determined by the time constant of capacitor 27, resistors 28 and 29, and the low impedance of four-layer diode 30. Since resistor 29 is relatively small compared to resistor 26, recovery time has been decreased substantially.

In the above example, current-limiting resistor 29 was fixed at about 100 ohms. Theoretically, the avalanche transistor circuit recovery time would be 0.8 microsecond and the theoretical repetition rate would be 1.25 megacycles. However, this theoretical repetition rate cannot in some instances be achieved because of the recovery time of four-layer diode 30. This recovery time may vary from 0.2 to one microsecond. In the above example, the output voltage wave shape is indicated at 53 with a time duration of 400 nanoseconds, and a voltage amplitude of about 64 volts. The voltage wave shape at terminal 41 is denoted by curve 54, has a time duration of 0.8 microsecond, and has an amplitude of about 80 volts. Note that its time duration has decreased by more than three orders of magnitude. Note also that the amplitude of the output voltage has not changed.

It will now be apparent to those skilled in the art how a four-layer diode 30 may be utilized in parallel with the resistor of a simple RC circuit to decrease the time constant of such a circuit. For example, a series circuit comprising a protective resistor, a diode, and a four-layer diode, properly poled, may be connected in parallel with the resistor, R, of the RC circuit. Where pulse inputs are applied to the RC circuit, the initial voltage developed across the resistor, R, by the pulse may be utilized to switch the four-layer diode to its "on" or low impedance state. In other cases trigger pulse circuits may be utilized to provide an external pulse at a predetermined time for triggering the four-layer diode to its "on" or low impedance state.

Although we have given a specific example with component values we are not to be limited thereto since it will be apparent to those skilled in the art that our circuit improvement and equivalents thereof will operate in any avalanche transistor circuit.

It will be understood that various changes in the details, materials and arrangement of parts which have been herein described and illustrated in order to explain the nature of the invention may be made by those skilled in the art within the principles and scope of the invention as expressed in the appended claims.

We claim:

1. In an avalanche transistor circuit having a collector resistor, a source of operating potential coupled to said resistor at one end thereof, and a collector capacitor coupled to said resistor at the other end thereof, the improvement for reducing the recovery time of said circuit, said improvement comprising a series circuit including a current-limiting resistor for protecting said transistor and a four-layer diode connected across said collector resistor and between said source and said capacitor, said four-layer diode normally having a high impedance state but capable of being switched to a low impedance state by a switching voltage less than said source, said switching voltage being developed across said collector resistor when said transistor avalanches to switch said four-layer diode to its low impedance state.

2. A resistance-capacitance circuit having means for changing its time constant at a predetermined time, said means comprising:

a resistor and a four-layer diode connected across said resistance of said resistance-capacitance circuit, said four-layer diode having a high impedance state and capable of being triggered to a low impedance state; and triggering means including said resistance of said resistance-capacitance circuit and operatively coupled to said four-layer diode for triggering said four-layer diode to its low impedance state at said predetermined time.

3. A resistance-capacitance circuit as in claim 2 in which said triggering means comprises an external trigger pulse circuit adapted to deliver a trigger pulse to said four-layer diode at said predetermined time.

4. In an avalanche transistor circuit comprising a semiconductive device operative in the avalanche mode and having a conductive and non-conductive state, said device including emitter, base and collector electrodes; a source of operating potential coupled to said collector through a resistor; a capacitor connected to the junction of said resistor and said collector; the improvement for reducing the recovery time of said circuit, said improvement comprising, in series, a second resistor and a four-layer diode connected between said source and said junction.

5. In combination, an avalanche transistor circuit including an avalanche transistor having collector, base and emitter electrodes; a source of potential coupled to said collector through a resistor; capacitive means coupled to the junction of said resistor and said collector; the improvement for providing an alternate path for recharging said capacitive means, said improvement comprising a series circuit connected between said source and said junction and including a second resistor and a four-layer diode.

6. A resistance-capacitance circuit having means for changing its time constant at a predetermined time, said means comprising a series circuit connected across said resistance of said resistance-capacitance circuit, said series circuit including a second resistor and a four-layer diode having a high impedance state and capable of being triggered to a low impedance state; and triggering means including said resistance of said resistance-capacitance circuit for triggering said four-layer diode to its low impedance state at said predetermined time.

(References on following page)

References Cited by the Examiner

UNITED STATES PATENTS

| | | | |
|---|---|---|---|
| 3,017,519 | 1/1962 | Dill | 307—88.5 |
| 3,080,489 | 3/1963 | White | 307—88.5 |
| 3,105,160 | 9/1963 | Adler | 307—88.5 |
| 3,114,056 | 12/1963 | Berge | 307—88.5 |
| 3,141,981 | 7/1964 | Henebry | 307—88.5 |
| 3,167,661 | 1/1965 | Rhodes | 307—88.5 |
| 3,171,040 | 2/1965 | Goebel | 307—88.5 |

ARTHUR GAUSS, *Primary Examiner.*

D. D. FORRER, *Assistant Examiner.*